United States Patent
Chen

(10) Patent No.: US 7,549,761 B2
(45) Date of Patent: Jun. 23, 2009

(54) FLAT PANEL DISPLAY AND BACKLIGHT MODULE THEREOF

(75) Inventor: Chia-Hung Chen, Padeh (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 63 days.

(21) Appl. No.: 11/892,897

(22) Filed: Aug. 28, 2007

(65) Prior Publication Data
US 2008/0111937 A1  May 15, 2008

(30) Foreign Application Priority Data
Nov. 9, 2006  (TW) .............................. 95141578 A

(51) Int. Cl.
  *G09F 13/04*  (2006.01)

(52) U.S. Cl. .................. 362/97; 362/222; 362/225; 362/221; 362/223

(58) Field of Classification Search ............... 362/217, 362/221–225, 97, 97.1, 97.2, 97.4, 612, 217.01, 362/217.08, 217.09, 12, 217.13, 217.02; 349/58–60, 70
See application file for complete search history.

(56) References Cited

U.S. PATENT DOCUMENTS

| 4,943,689 | A  | * | 7/1990 | Siefer et al. ............... 178/18.11 |
| 6,902,300 | B2 | * | 6/2005 | Lee ............................ 362/306 |
| 7,163,319 | B2 | * | 1/2007 | Kuo et al. .................... 362/306 |
| 7,217,000 | B2 |   | 5/2007 | Wu |
| 7,325,937 | B2 | * | 2/2008 | Aoki et al. ..................... 362/97 |
| 7,407,318 | B2 | * | 8/2008 | Chang ......................... 362/632 |
| 2002/0044437 | A1 |   | 4/2002 | Lee |
| 2005/0073858 | A1 |   | 4/2005 | Kim et al. |
| 2006/0104083 | A1 | * | 5/2006 | Kwon ......................... 362/559 |

FOREIGN PATENT DOCUMENTS

TW  594196 B  6/2004

* cited by examiner

*Primary Examiner*—Jacob Y Choi
*Assistant Examiner*—Robert May
(74) *Attorney, Agent, or Firm*—Muncy, Geissler, Olds & Lowe, PLLC

(57) ABSTRACT

A backlight module includes a frame with a bottom surface and at least one protrusion with a hole formed on the bottom surface of the frame. A tube set configured in the frame, a diffusion plate configured over the frame, and at least one support component configured within the fluorescent tube set, wherein the support component includes a support body with a projection on its bottom and fixes the projection into the hole to sustain the diffusion plate. A set of fin set around the projection separately. The backlight module can be applied to the flat panel display.

18 Claims, 5 Drawing Sheets

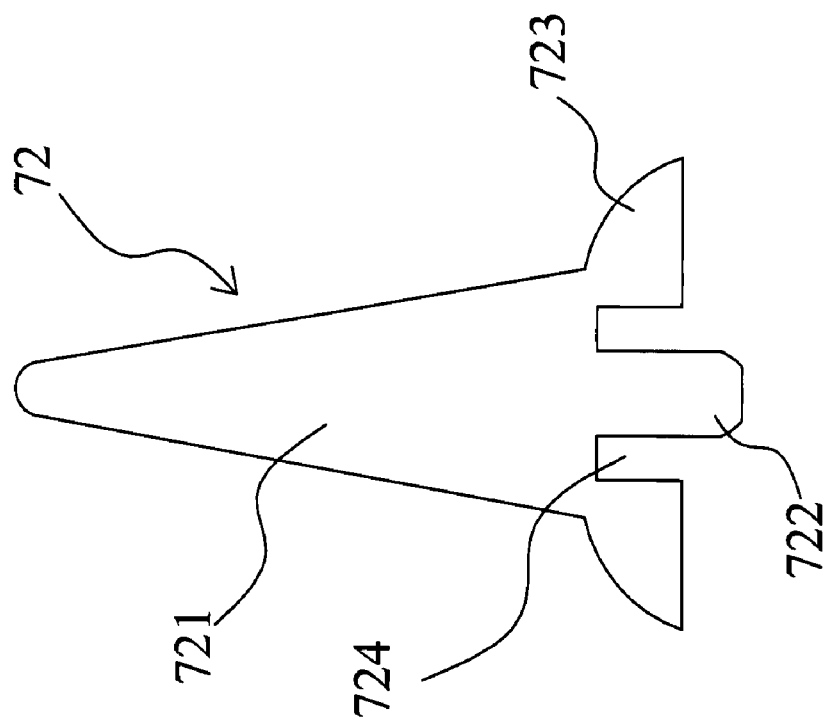
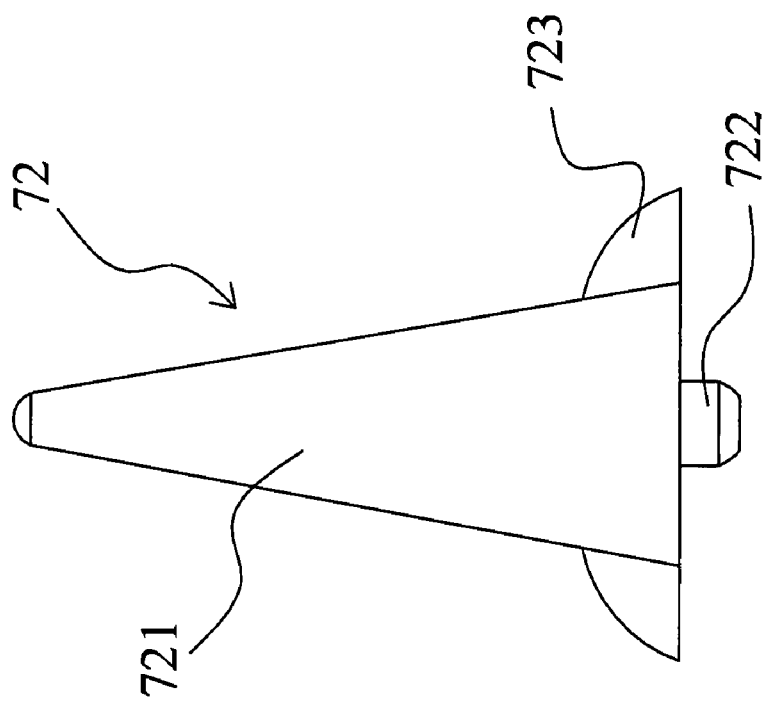
Fig. 4b
Fig. 4a

FLAT PANEL DISPLAY AND BACKLIGHT MODULE THEREOF

BACKGROUND OF THE INVENTION

1. Field of the Invention

The present invention relates to a flat panel display, and more especially, to a backlight module of the flat panel display.

2. Background of the Related Art

Liquid crystal display (LCD) is widely applied to the flat panel display apparatus due to the advantages of high resolution and the better image quality. Because the LCD panel is not self-illuminative, a backlight module is utilized as a self-illumination device to generate a visible video display. Therefore, a direct illuminated backlight module, which is set under the LCD panel, is adopted generally to satisfy high illumination demand of the big-sized flat panel display.

As shown in FIG. 1, a conventional direct illuminated backlight module 10 includes: a frame 12 with a bottom surface and a fillister 16 formed on the bottom surface; a plurality of fluorescent tubes 14 configured on the surface of the frame 12 and a diffusion plate 18 configured over the frame 12 to increase the uniformity of brightness; a support component 20 including a spring 22 and a support body 24, wherein the spring 22 is configured within the fillister 16 and the support body 24 connects the top of the spring 22 to protrude out of the fillister 16 and keep a space with the diffusion plate 18 or hold the diffusion plate 18. This support component 20 can sustain the diffusion plate 18 and avoid the damage caused by shaking the diffusion plate 18. However, this kind of backlight module 10 does not only increase the thickness of the backlight module because of the fillister 16, but also raise the fabricating cost and process time due to the set of the spring.

In another conventional direct illuminated backlight module 30, a support structure of the diffusion plate 32 is shown in FIG. 2, wherein a support component 34 is integrated with a tube-fixed seat 36, which includes a bigger top plate 38, a smaller bottom plate 40 and a connection portion 42 connecting the top plate 38 and the bottom plate 40. The tube holder 44 with the fluorescent tubes 54 and the support component 34 are configured on the top plate 38, and two protrusions 46 are formed on the bottom plate 40 and located on two sides of the connection portion 42, respectively. Further, a connecting hole 50 is arranged on the surface of the frame 48 of the backlight module 30 and two cavities 52 are formed at two sides of the connecting hole 50. Accordingly, the bottom plate 40 passes through the connecting hole 50 and the tube-fixed seat 36 is rotated to fix on the surface of the frame 48 by making two protrusions 46 arranged into two cavities 52, respectively. However, in this backlight module 30, the fixed intensity of the support component 34 is not good because the bottom plate 40 of the tube-fixed seat 36 protrudes out of the frame 48 and can be easily bumped by other components.

Furthermore, in another conventional backlight module, the diffusion plate and the support component come in one-piece by injection, however the sustaining effect of this support component is not ideal due to its expansion when hot and shrinking when cold.

SUMMARY OF THE INVENTION

In order to solve the forgoing problems, one object of the present invention is to provide a flat panel display and a backlight module thereof, wherein the support component is directly fixed on the frame to have the advantages of the simple fabrication and low cost.

One object of the present invention is to provide a flat panel display and a backlight module thereof, wherein the support component does not protrude out of the frame, hence the fabrication of other components in the flat panel display will not collide, and have the advantage of not affecting the fabrication of the flat panel display.

One object of the present invention is to provide a flat panel display and a backlight module thereof, wherein the fixed strength between the support component and the frame is reliable because the support component is directly screwed into the frame.

According to one of the embodiments for the present invention, a backlight module includes: a frame with a bottom surface, and at least one hole formed on the bottom surface of the frame; a tube set configured within the frame; a diffusion plate configured over the frame; and at least one support component configured within the tube set, and the support component including: a support body with a projection on the bottom of the support body, wherein the projection is fixed into the hole and the top of the support body sustains the diffusion plate; and a set of fin formed around the projection, wherein a space is between the projection and the set of fin.

Another embodiment of the present invention provides a flat panel display including: a display panel and a backlight module configured under the display panel, wherein the backlight module includes: a frame with a bottom surface, and at least one hole formed on the bottom surface of the frame; a tube set configured within the frame; a diffusion plate configured over the frame; and at least one support component configured within the tube set, and the support component including: a support body with a projection on the bottom of the support body, wherein the projection is fixed into the hole and the top of the support body sustains the diffusion plate; and a set of fin formed around the projection, wherein a space is between the projection and the set of fin.

BRIEF DESCRIPTION OF THE DRAWINGS

FIG. 4a and FIG. 4b are respectively a from-view diagram and a cross-sectional diagram of a support component in accordance with an embodiment of the present invention.

DETAILED DESCRIPTION OF THE INVENTION

Figure 1:
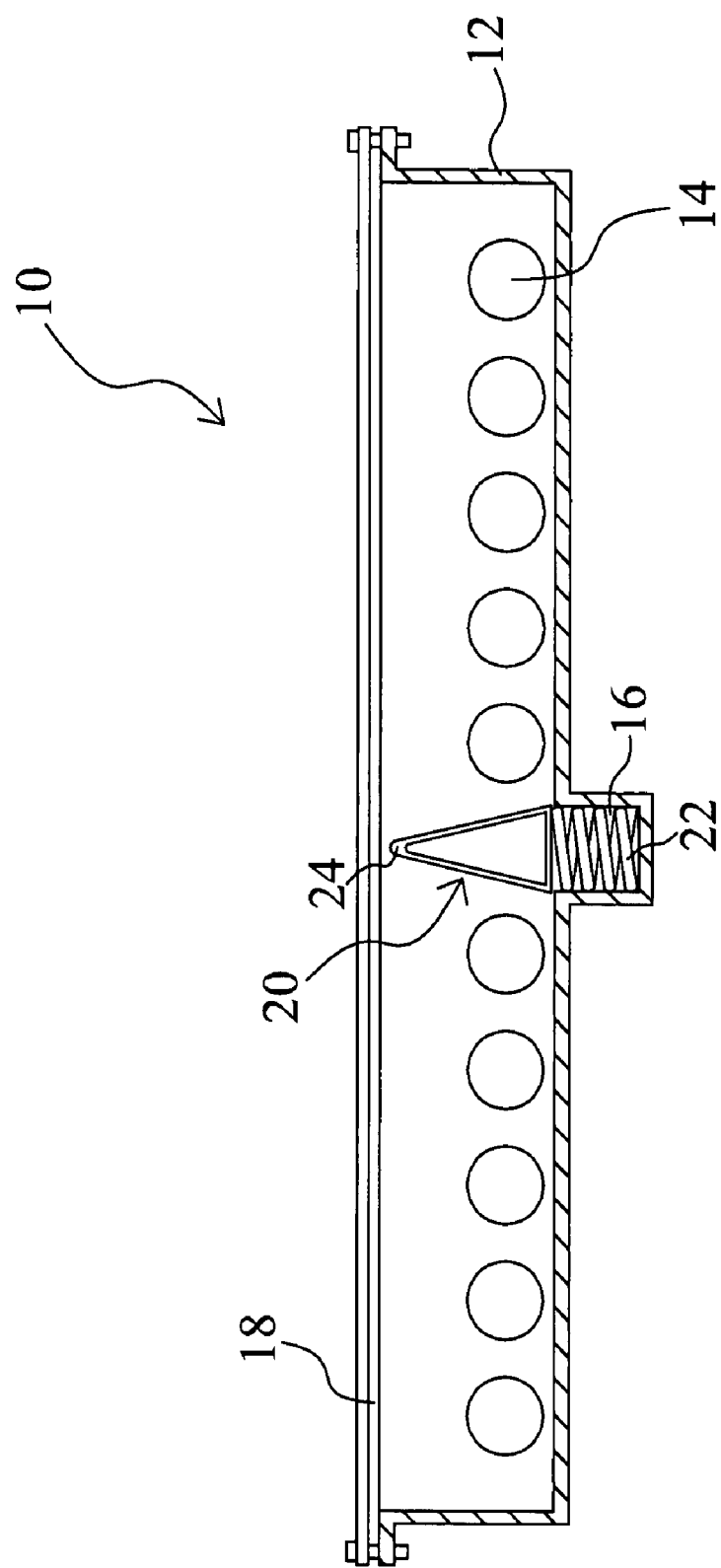
FIG. 1 is a cross-sectional diagram illustrating a conventional backlight module.
Figure 2:
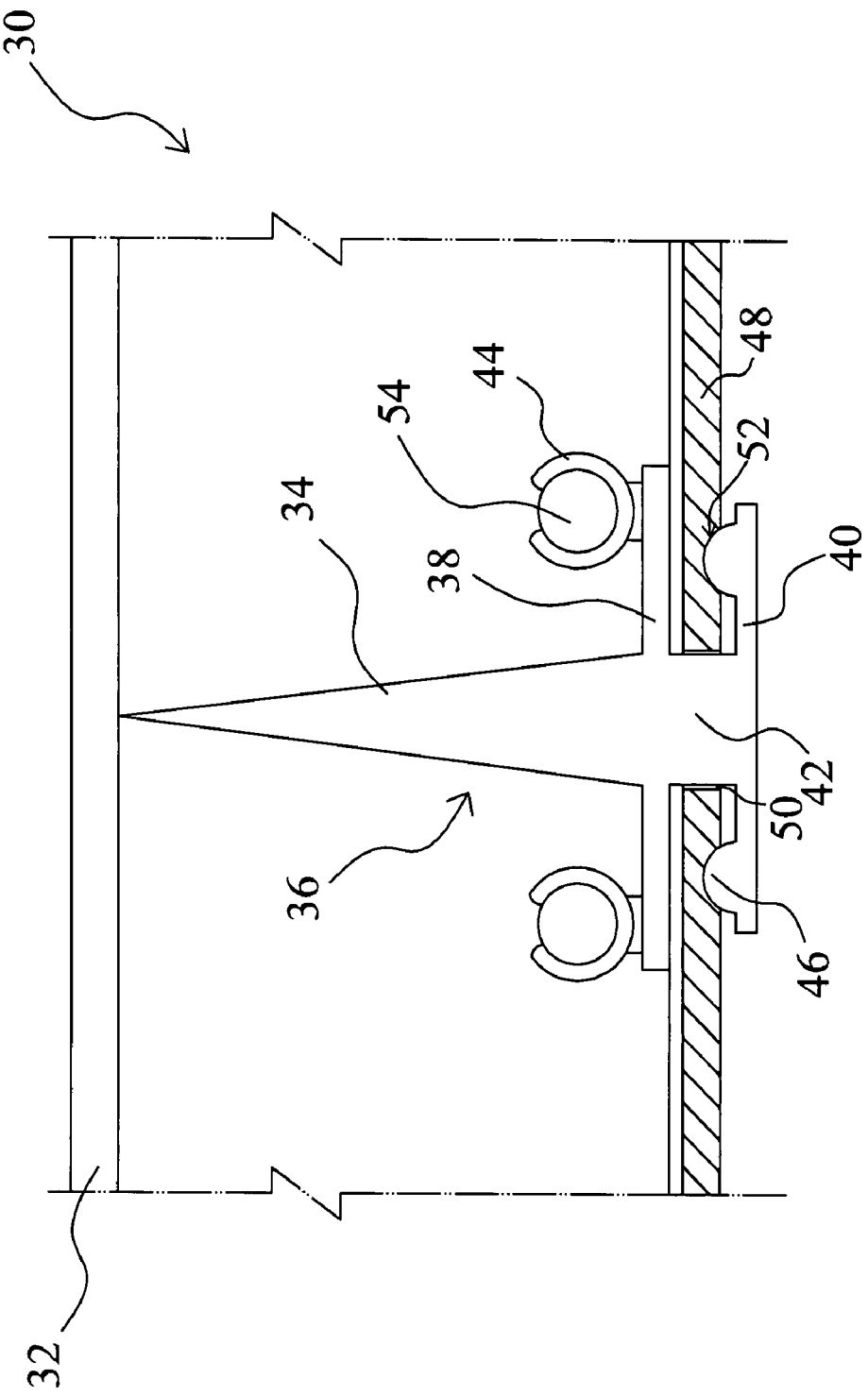
FIG. 2 is a cross-sectional diagram illustrating another conventional backlight module.
Figure 3:
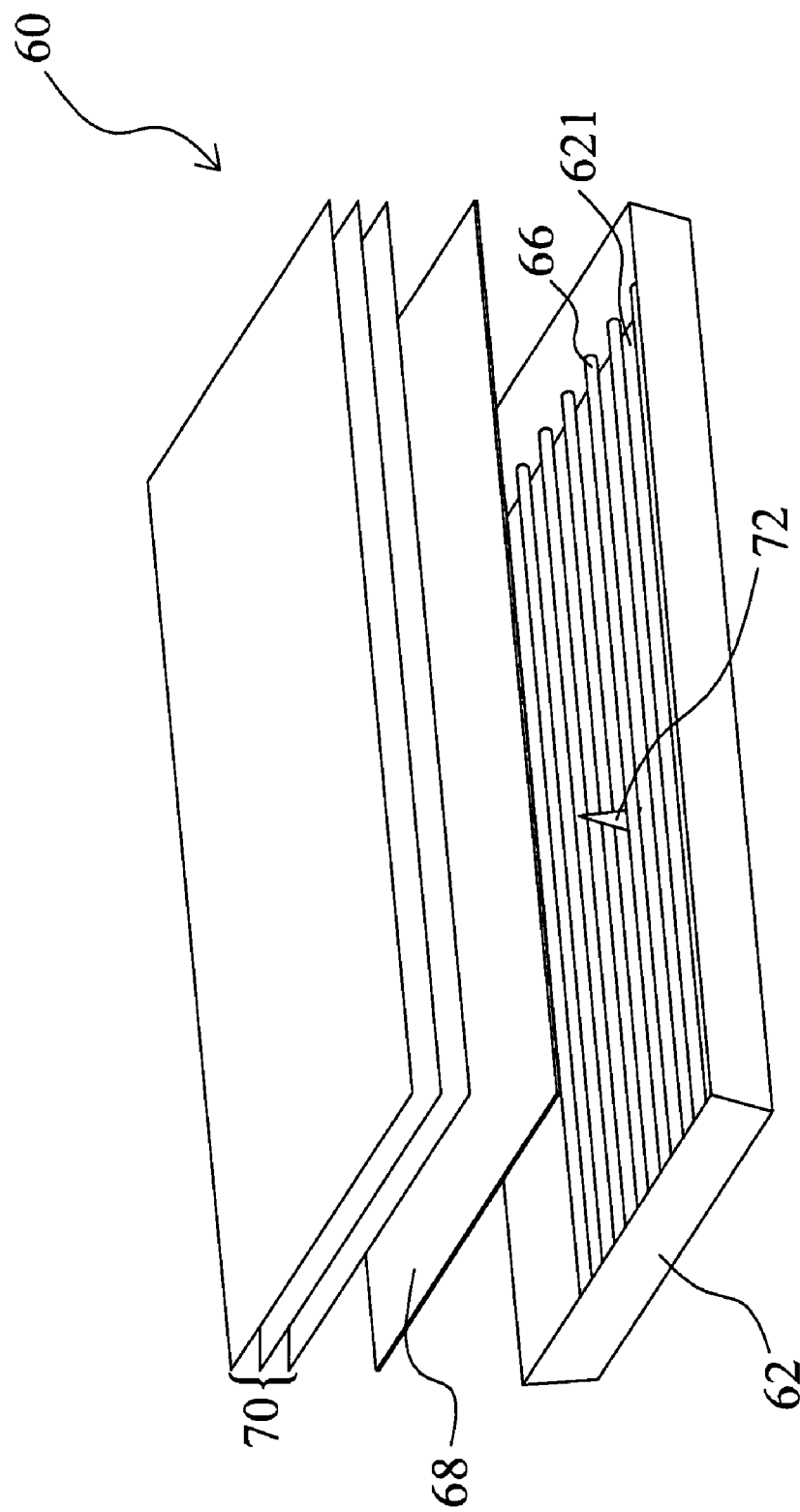
FIG. 3 is a disassembling structure diagram illustrating the backlight module in accordance with an embodiment of present invention

FIG. 3 is a disassembling structure diagram illustrating the backlight module in accordance with an embodiment of the present invention. In this embodiment, a backlight module 60 includes a frame 62 with a bottom surface 621. A tube set includes a plurality of fluorescent tubes 66, which are separately arranged within the frame 62 by fixing two ends of each fluorescent tube 66 on the opposite side walls of the frame 62. A reflector (not shown in FIG. 3) is configured on the bottom surface 621 and the inside of walls of the frame 62 to reflect all the beams of light from the fluorescent tubes 66. A diffusion plate 68 is configured over the top surface of the frame 62 to make brightness uniform, and a plurality of optical films 70 are disposed on the diffusion plate 68. At least one support component 72 is configured on the bottom surface 621 of the frame 62 and within the interval of two adjacent fluorescent tubes 66 to sustain the diffusion plate 68.

Hence, as shown in FIG. 4A and FIG. 4B, the support component 72 includes a support body 721 with a projection 722 on the center of the bottom of the support body 721, and a set of fin 723 is formed around the projection 722 with a space 724 from the projection 722.

Figure 5:
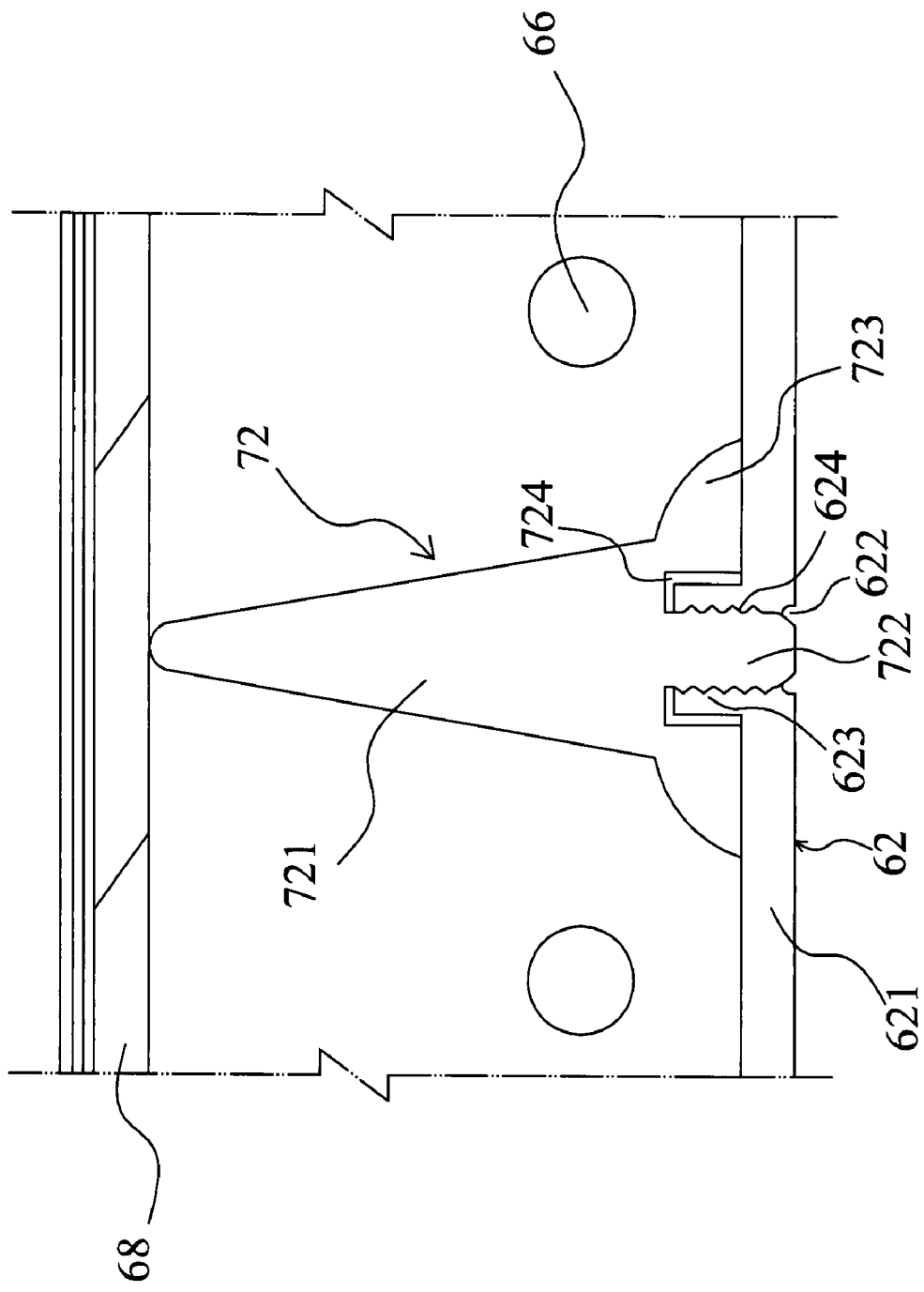
FIG. 5 is a cross-sectional diagram illustrating the combination of the support component with the frame in accordance with an embodiment of the present invention.

FIG. 5 is a cross-sectional diagram illustrating the combination of the support component 72 with the frame 62, please refer to FIG. 5, a hole 622 with thread-screwed side wall and a protrusion 623 are arranged on the bottom surface 621 of the frame 62 and within the interval of two adjacent fluorescent tubes 66, wherein the protrusion 623 has an open hole with a plurality of continuous screwed threads 624 on its side wall, and the open hole of the protrusion 623 corresponds and passes through the hole 622. Furthermore, the hole 622 and the protrusion 623 are integrated within the frame 62. The projection 722 of the support component 72 is screwed into the hole 622 and the open hole of the protrusion 623, and utilizing the space 724 between the set of fin 723 and the projection 722 to hold the protrusion 623, and so as to fix the support component 72 on the frame 62 and then the support body 721 of the support component 72 sustains the diffusion plate 68. Hence, the length of the projection 722 equals the depth of the open hole of the protrusion 623.

Continuously, the frame 62 is made of rigid material and the support component 72 is made of plastic. Please refer to FIG. 5, when the support component 72 is combined with the frame 62, the projection 722 is screwed into the hole 622 and the open hole of the protrusion 623 by turning the set of fin 723, and then the outer surface of the projection 722 is screwed to combine tightly with the screwed threads 624 to have the advantage of strong fixed strength. Further, the support body 721 is a cone with a taper on its top to touch the diffusion plate 68 to avoid the generation of the wider black spot on the diffusion plate 68.

The foregoing backlight module can be applied to the flat panel display and set under the display panel of the flat panel display in general. In the present embodiment, only a support component illustrated in the backlight module, however, as the size of the display panel is bigger, the size of the diffusion plate is also bigger, the backlight module can contain any amount of support components to sustain the diffusion plate effectively.

To sum up, in the present invention, the support component is directly screwed into the frame without other additional component to have the advantages of simple fabrication and low cost. Further, the fixed strength between the support component and the frame is strong since the support component is directly screwed into the frame. Because the support component does not protrude out of the frame, the other components in the flat panel display will not collide and can prevent the support component from loosening, and have the advantage of not affecting the fabrication of the flat panel display. If the protrusion extends to the outside of the frame according to another design, the support component also will not be loosened by collision due to the protection of the protrusion.

Although the present invention has been explained in relation to its preferred embodiment, it is to be understood that other modifications and variation can be made without departing the spirit and scope of the invention as hereafter claimed.

What is claimed is:

1. A backlight module, comprising: a frame with a bottom surface, and at least one hole formed on a bottom surface of the frame; at least one protrusion with an open hole integrated on the bottom surface of the frame, wherein the open hole corresponds to the hole on the bottom surface of the frame, and a plurality of screwed threads are formed on a side wall of the open hole; a tube set configured within the frame; a diffusion plate configured over the frame; and at least one support component configured within the tube set, and the support component comprising: a support body with a projection on a bottom of the support body, wherein the projection is threadably engaged with the hole and a top of the support body sustains the diffusion plate; and a set of fins formed around the projection, wherein a space that engages the protrusion, is between the projection and the set of fins.

2. The backlight module according to claim 1, wherein the hole is integrated within the frame.

3. The backlight module according to claim 1, further comprising a plurality of screwed threads formed on an inner side wall of the hole.

4. The backlight module according to claim 1, wherein the projection is integrated with the support body.

5. The backlight module according to claim 1, wherein the support body and the projection are made of plastics.

6. The backlight module according to claim 1, wherein the support body is a cone.

7. The backlight module according to claim 1, wherein the frame is made of rigid material.

8. The backlight module according to claim 1, further comprising a reflector formed on the bottom surface and inner walls of the frame.

9. The backlight module according to claim 1, further comprising a plurality of optical films disposed on the diffusion plate.

10. A flat panel display, comprising: a display panel and a backlight module configured under the display panel, wherein the backlight module comprises: a frame with a bottom surface, and at least one hole formed on a bottom surface of the frame; at least one protrusion with an open hole integrated on the bottom surface of the frame, wherein the open hole corresponds to the hole on the bottom surface of the frame, and a plurality of screwed threads are formed on a side wall of the open hole; a tube set configured within the frame; a diffusion plate configured over the frame; and at least one support component configured within the tube set, and the support component comprising: a support body with a projection on a bottom of the support body, wherein the projection is threadably engaged with the hole and a top of the support body sustains the diffusion plate; and a set of fins formed around the projection, wherein a space that engages with the protrusion, is between the projection and the set of fins.

11. The flat panel display according to claim 10, wherein the hole is integrated within the frame.

12. The flat panel display according to claim 10, further comprising a plurality of screwed threads formed on an inner side wall of the hole.

13. The flat panel display according to claim 10, wherein the projection is integrated with the support body.

14. The flat panel display according to claim 10, wherein the support body and the projection are made of plastics.

15. The flat panel display according to claim 10, wherein the support body is a cone.

16. The flat panel display according to claim 10, wherein the frame is made of rigid material.

17. The flat panel display according to claim 10, further comprising a reflector formed on the bottom surface and side walls of the frame.

18. The flat panel display according to claim 10, further comprising a plurality of optical films disposed on the diffusion plate.

* * * * *